United States Patent [19]

Forster et al.

[11] Patent Number: 4,946,695

[45] Date of Patent: * Aug. 7, 1990

[54] PROCESS FOR THE EXTRACTION OF NONPOLAR CONSTITUENTS FROM PLANT MATERIAL

[75] Inventors: Adrian Forster; Stefan Geyer; Josef Schulmeyr; Roland Schmidt; Manfred Gehrig, all of Wolnzach, Fed. Rep. of Germany

[73] Assignee: Hopfen-Extraktion HVG Bart, Raiser & Co., Wolnzach, Fed. Rep. of Germany

[ * ] Notice: The portion of the term of this patent subsequent to Jun. 27, 2006 has been disclaimed.

[21] Appl. No.: 332,244

[22] Filed: Mar. 31, 1989

Related U.S. Application Data

[63] Continuation-in-part of Ser. No. 100,798, Sep. 24, 1987, Pat. No. 4,842,878.

[30] Foreign Application Priority Data

Sep. 24, 1986 [DE] Fed. Rep. of Germany ....... 3632401

[51] Int. Cl.$^5$ ............................................... C12C 3/00
[52] U.S. Cl. .................................... 426/286; 426/422; 426/429; 426/600

[58] Field of Search ............... 426/286, 423, 422, 424, 426/425, 597, 600, 532, 429, 271, 534, 472, 474, 487, 486, 478, 475, 435, 434, 433, 432, 431, 430, 387, 386, 330.3, 330 S, 629, 419, 489, 490

[56] References Cited

U.S. PATENT DOCUMENTS

| | | | |
|---|---|---|---|
| 4,113,886 | 9/1978 | Katz | 426/490 |
| 4,260,639 | 4/1981 | Zosel | 426/478 |
| 4,411,923 | 10/1983 | Hurbert | 426/478 |
| 4,842,878 | 6/1989 | Forster | 426/286 |

FOREIGN PATENT DOCUMENTS

| | | | |
|---|---|---|---|
| 3303679 | 8/1984 | Fed. Rep. of Germany | 426/271 |
| 3413869 | 10/1985 | Fed. Rep. of Germany | 426/597 |
| 3443390 | 5/1986 | Fed. Rep. of Germany | 426/597 |

*Primary Examiner*—Carolyn Paden
*Attorney, Agent, or Firm*—Jordan and Hamburg

[57] ABSTRACT

This invention relates to a process for extracting nonpolar constituents from natural substances such as hops with simultaneous separation of residues of nonpolar plant protectives (fungicides/insecticides). In a first step, the plant protective as well as other ingredients that are soluble under the chosen conditions is extracted with compressed gases, and in a subsequent stage, the dissolved mixture is passed through an adsorbent and the plant protective is selectively removed from the mixture.

16 Claims, No Drawings

PROCESS FOR THE EXTRACTION OF NONPOLAR CONSTITUENTS FROM PLANT MATERIAL

This is a continuation-in-part application of parent application Ser. No. 100,798, filed Sep. 24, 1987, which is now U.S. Pat. No. 4,842,878.

BACKGROUND OF THE INVENTION:

This invention is addressed to a process for the extraction of nonpolar constituents from natural substances such as hops, with the simultaneous separation of the residues of nonpolar plant-protecting agents. The hop plant is named in this connection only by way of example, since the problem of removing undesirable residues occurs in numerous natural substances, whether the starting substances are cultivated or wild.

The constituents which determine the value of hops are the hop resins and hop oils. The most important hop resins, the $\alpha$- and $\beta$-picric acids, as well as the other soft resins, are of a nonpolar, lipophilic character, and so are the terpenes and sesquiterpenes of hop oil. Since all these substances are relatively unstable, there are many possibilities for separating and concentrating the important constituents of vegetable matter by extraction with suitable solvents (on the state of the art, see for example SANDER, W. and DEUBLEIN, B., in Brau-Industrie 1982, p. 997).

Such extractants are organic solvents, especially dichloromethane, hexane, methanol, or ethanol. Recently, the extraction of hops with highly compressed $CO_2$ has been described. In the process according to German Federal Patent No. 21 27 618, $CO_2$ at supercritical pressure and temperature is used as the extractant. The separation of the desired substances from the solvent is then performed by reducing the density by lowering the pressure with simultaneous evaporation of the $CO_2$. The $CO_2$ extracts thus obtained are regarded in the industrial field as especially pure and stable.

Hops are treated during their growing season from March to August with numerous plant protectives which ultimately always lead, regardless of their form, to residues, even though sometimes in minute amounts. In the Federal Republic, about 40 plant protectives are presently approved for hop growing.

The residues of these plant protectives are understandably undesirable in every case, as is underlined by their intensive public discussion. Raw materials for beer-making are especially subject to critical evaluation, since beer has proven, on account of the demand for purity, to be a very sensitive food substance. Consequently, it would be considered advantageous if it were possible to produce hops and hop products of very low residue content.

It is already possible to reduce the amount of residues that occur by developing and growing disease-resistant types of hops, but freedom from residues is an unattained goal. A partial reduction can also be achieved by solvent extraction. The more selective a solvent is, the fewer are the residues that can be extracted. Results have been published on dithiocarbamate residues, for example, in Brauwelt, 1981, 825 (Nitz, S. et al.), and on heavy metals in Brauerei-Rundschau, Vol. 92, July 1981, No. 7 (Schur, F. et al.). Even though it is to be assumed that the very selective and nonpolar solvent carbon dioxide has the advantage over ethanol, for example, that it does not dissolve plant protectives of a polar nature, there are a number of nonpolar protectives which can be dissolved out of the plants by $CO_2$ extraction. For example, in *Planta Medica* No. 2, April 1984, pp. 171-173, there is a report on the possibility of removing plant protectives from drugs with supercritical carbon dioxide. DDT and hexachlororcyclohexane as lipophilic constituents are extracted at relatively low pressures (80-120 bar) from drugs whose value-determining substances are extracted only at higher pressures (above 150 bar), or which have, so to speak, a polar character whereby they are indissoluble in $CO_2$. The authors come to the conclusion that the process described is applicable only to plants which do not contain lipophilic substances such as ethereal oils, for example.

However, the substances obtained from hops are lipophilic, and thus the process described in *Planta Medica* is not applicable to hops.

Attempts to reduce residue content have been performed with three important representatives of plant protectives:

1. Folpet (N-(trichloromethylthio)-phthalimide) and
2. Metalaxyl (D,L-N-2,6-dimethylphenyl-N-(2'-methoxyacetyl)alanine methyl ester)

as fungicides, and

3. Endosulfan (6,7,8,9,10,10-hexachloro-1,5,5a,6,9,9a-hexahydro-6,9-methano-2,4,3-benzodioxathiepin 3-oxide)

as an insecticide.

Studies with folpet insecticide (N-(trichloromethylthio)phthalimide), which is used preferentially against fungus infections by Peronospora, Phomapsis, Fusicladium, Botrytis, etc., have shown that under all conditions known heretofore, both in the liquid range (e.g., 70 bar, 15° C. or 150-300 bar, 25° C.) and in the supercritical range (150-300 bar, 40-80° C.), extraction with $CO_2$ is successful. Upon the necessary separation, therefore, the extract and the folpet occur together. Decontamination can be performed at 80-100 bar and 60° C. from, for example, 50 ppm in the starting hops, to 0.5 ppm. However, the advantage of the 99% removal of the residue is offset by the disadvantage that about 10 to 20% of the soluble extract goes with it. The separation of this extract containing the folpet leads to a product in which the residue is greatly concentrated, and which must be discarded. The extraction of the active substances from the hops thus decontaminated can then be performed under normal extraction conditions. Therefore, while on the one hand a virtually residue-free extract is produced, on the other hand there is an unacceptable economic disadvantage in the form of the extract produced by the decontamination.

In sum, the use of plant-protective agents (insecticides, fungicides, herbicides) is unavoidable, at least with monocultures and under unfavorable climatic conditions. It may thus be desirable, or even necessary, to separate these poisonous substances from the materials of value used in the food area. This is easily possible, provided that the materials of value are not dissolved at the same time as the poisonous substances during an extraction. However, if both groups of materials show a similar behavior toward the solvent, a separation in this simple manner is not possible.

SUMMARY OF THE INVENTION:

The need thus exists for a remedy whereby fungicide, herbicide and insecticide residues can be separated without at the same time losing unacceptably large amounts of hop extract. A virtually complete removal of the residues is the object. This is achieved by the present invention, in a process of the kind referred to above, in that, in a first step of the process, the plant protective as well as other constituents which are soluble under selected conditions are extracted from natural substances with compressed gases, and in a subsequent step the dissolved mixture is passed through an adsorbent and the plant protective is removed selectively from the mixture. Thus, in the first step, the extractant, especially $CO_2$, is pumped through, for example, a batch of hops, and the residues of plant protectives adhering to the hops—folpet in the case of one example studied—are dissolved along with an appreciable amount of hop oils and resins. The plant protective is extracted at a low density of the extractant at a pressure between 70 and 120 bar and temperatures between 40° C. and 80° C. In a subsequent second step, the mixture of hop constituents and plant protectives dissolved in the first step is transferred to an autoclave that contains the adsorbent, which now binds the plant protective and retains it, while having no adsorbing action on the resins and oils of the hops.

Accordingly, pursuant to the invention, it is proposed to dissolve poisonous substances and materials of value simultaneously from hops and to pass the mixture over a suitable absorbent, where the poisonous substances are retained as selectively as possible.

As solvent, a compressed gas is proposed, hypercritical carbon dioxide being especially preferred. Based on the instant description of the invention, and the Examples given below, it is within the level of ordinary skill in the art to determine the particular conditions of pressure and temperature, for a given extraction, so that losses of materials of value are slight and the poisonous substances are separated as selectively as possible. For example, the use of Celite 545 or of polyvinylpolypyrrolidone (PVPP) has proved to be particularly advantageous for retaining the fungicide "Folpet."

It has further been ascertained that the separation of undesirable materials by the method of the invention is also successful with a wide variety of starting materials other than hops.

For example, plant-protective agents can be removed in accordance with the present invention during the recovery of the following categories of natural substances:

1. vegetable oils, for example, from oil-bearing seeds, seeds and nuts;
2. aromatic and odorous substances, for example, from fruits, vegetables, herbs and tobacco;
3. drugs, for example, from medicinal herbs and roots; and
4. spice extracts, for example, from spice plants such as aniseed, fennel, garlic, caraway, marjoram, cloves paprika, pepper, vanilla, onions and cinnamon.

The following definitions will serve to exemplify the above categories of natural substances to which the process of the present invention is applicable:

1. Oil Plants. Fats and oils are frequently encountered as nutrients or reserve materials in the plant kingdom, mostly in the seeds, less frequently also in the flesh or pulp (example: oil palm). On the other hand, essential oils, which are not nutrients, occur in all parts of the plant. Important suppliers of vegetable oils and fats for human and animal consumption, for industrial purposes (for example, drying oils for paints, etc.) and also for cosmetic and/or medical use are the oil-producing fruit of the olive tree (olives), of the oil palms and the avocado, while the seeds and kernels of rape, flax, soybean, cotton, peanut, sunflower, pumpkin, castor, poppy, sesame, coconut, cocoa and almonds belong to the oil seeds; oils are also extracted from walnuts and hazelnuts and grape seeds. The oils are obtained by pressing and/or extraction with organic solvents or water. The residues (oil cakes press cakes) can often be used as animal feed; however, they frequently contain plant poisons (such as gossypol, ricin) or introduced mycotoxins (such as aflatoxins; Dietrich loc. cit.).

2. Drugs (from the Dutch droog=dry or from the Arabic). In the true sense, drugs are understood to be materials especially of vegetable but also of animal origin, which are used either as such or in the form of extracts or decoctions (see also maceration, infusion, percolation), etc., as remedies or medicines (phytopharmaceuticals) or for technical purposes. The systematic research of drugs falls into the field of pharmacognosy. The following are vegetable drugs (the Latin names and examples are given in parentheses): balsams (balsamum: Peru balsam). Leaves (folia: senna leaves). Flowers (flores: camomile flowers). Fruit (fructus: juniper berries). Rubber types and resins (rubber and resina: jalap resin, mastic). Wood (lignum: Quassia wood), herbs (herba: lily of the valley herbs). Bark (cortex: cinchona bark). Seeds (semen: linseed). Tar (pix: juniper tar). Roots (radix and rhizoma: ginseng, ginger). Onions (bulbus: sea onion). Known drugs of animal origin are ambergris, musk, ox gall, Spanish fly (cantharidin), codliver oil, etc. The storage, handling, and further processing of drugs (for example, sampling, comminution, preparation of extracts) are subject to regulations in the Federal Republic of Germany, and the trade in drugs outside of pharmacies is governed by the Drugs and Poisons Law. Drugs and extracts valued at 200 million DM were produced in the Federal Republic of Germany in 1978. See Graf and Scheer (Pharm. Ind. 42 (1980) 732–744) for methods to reduce the germ count in drugs. For the history of drug news, see Steineck (Dragoco Rep. 26 (1979) 106–116) and Hickel (Pharmazie uns. Zeit 1 (1972) 26–30).

In recent years, the term "drugs" in everyday language is used predominantly for those materials which induce narcosis and generally also a drug dependence. Compounds of synthetic origin, such as amphetamine and cerebral stimulants of the amino group, LSD and also materials subject to the BMVVO are also included. Occasionally, one speaks of "soft" drugs, such as marijuana and hashish, in contrast to "hard" drugs, such as opium and heroin.

3. Spices. In the narrower sense, spices are plant parts of different kinds (roots, root pieces, onions, bark, leaves, herbs, flowers, fruit, seed and parts thereof) which are suitable as aromas and essences because of their aromatic or spicy taste and odor and are used as seasonings for human food, to aromatize alcoholic beverages (herb liqueurs, bitters) or for the preparation of carminativa and/or stomachika. The nutritional value is slight and hardly comes into consideration in any evaluation. However, spices have an important function, namely, of stimulating the secretion of saliva and thus of promoting the digestion. In addition, a number of spice plants, as drug-supplying healing plants, have been in use since ancient times in folk medicine. The known spices, some of which are native and tropical, are angelica, anise, basil, mugwort, savory, borscht, watercress, chili, curcuma, dill, marjoram, tarragon, fennel, galingale, clove, ginger, myrtle, capers cardamom, lady's- comb, garlic, coriander, caraway, lovage, nutmeg, mint, horseradish, poppy, nutmeg apple, oregano, paprika, parsnip, parsley, pepper, peppermint, pimento, burnet, saxifrage, leek, thyme, rosmarin, safran, sage, sesame, Indian anise, vanilla, juniper, waldmeister, "Weinraute," hyssop, cinnamon, lemon, balm, onion, as well as some spicy mushrooms such as truffles and mousseron. A special spice mixture is curry. The list is in no way complete, but merely introduces examples.

Likewise, the following list of plant-protective agents also does not claim to be complete. Depending on the statutory conditions and on the changing effectiveness, other plant-protective agents may come into consideration. The inventive method can be used if the plant-protective agents are soluble in the compressed gas and if a suitable absorbent is known.

Exemplary Active Ingredients of Plant-Protective Agents Within the Scope of Consideration of the Invention (a)
Fungicides:
  Dichlofluanide
  Fenarimol
  Folpet
  Copper oxychloride
  Metalaxyl
  Procymidon
  Vinclozolin
(b)
Insecticides:
  Cyfluthrin
  Cypermethrin
  Deltamethrin
  Fenvalerat
  Permethrin
  Aldicarb
  Carbaryl
  Carbofuran
  Methomyl
  Oxamyl
  Endosulfan

DETAILED DESCRIPTION OF THE PREFERRED EMBODIMENTS:

The following table shows the adsorbing action of a number of adsorbents for folpet, and for the extracted valuable substances of hops.

| Adsorbent | Adsorption of Folpet | Resin and Oil |
|---|---|---|
| Active charcoal | + | + |
| Kieselgur, coarse | (+) | − |
| Kieselgur, fine | (+) | − |
| Celite 545 | + | − |
| Celite 512 | − | − |
| Silica gel 90 mesh | + | (−) |
| Ion exchanger | − | − |
| Aluminum oxide | + | + |
| Magnesium oxide | + | + |
| Sodium bentonite | + | (−) |
| PVPP (polyvinylpolypyrrolidone) | + | − |

+ Good, quantitative adsorption
(+) Good, but not quantitative adsorption
− No adsorption
(−) Slight adsorption.

Of the agents listed in the table, Celite 545 and PVPP have proven to be well-suited, sodium bentonite, silica gel and kieselgur, less well-suited. The mixture of solvent and extracted substances, freed of the fungicide by adsorption, is separated by density reduction, e.g., by pressure reduction and carbon dioxide evaporation. This can be achieved, for example, at pressures between 40 and 60 bar and temperatures above the vapor pressure curve at which the carbon dioxide solvent is in gaseous form. The $CO_2$ freed from the hop constituents is then liquefied and returned to the extraction circuit. In an especially advantageous manner, the mixture is returned after the adsorption without reducing its pressure, i.e., an isobaric solvent circuit is maintained with a circulating pump. On the one hand, the compression costs are reduced, and on the other hand, hop constituents are dissolved only until the solvent is saturated. When the desired plant protectives have been extracted and adsorbed, the adsorption autoclave can be taken out of the circuit, and the optimum conditions can be established as they are in a normal extraction. A specifically suitable adsorbent must be found for each plant protective, one which does not act or acts but slightly on the hop constituents. The "adsorbent" can consist also of one or more agents, and a succession of several agents or a mixture is conceivable. It is also to be noted that an optimum temperature range is to be established for each adsorbent so as to prevent any possible desorption, i.e., the temperature is selected such that the adsorption/desorption equilibrium lies on the adsorption side.

The following comparative examples show the extractability of a nonpolar plant protective, such as folpet, when conventional processing is used. Hops heavily contaminated with 78.9 ppm of folpet were used. The solvents were hexane, dichloromethane, 100% ethanol, a mixture of 10% water and 90% ethanol, and carbon dioxide under three conditions. The following table shows the folpet residues in the spent hops after an exhaustive resin extraction, the folpet contents in the extracts, and, in the last column, the recovery percentages with respect to the 78.9 ppm:

| Extractant | ppm of folpet in spent hops | ppm of folpet in extract | Recovery rate in % relative |
|---|---|---|---|
| Hexane | 1.2 | 533.5 | 82.5 |
| Dichloromethane | n.n. | 429.1 | 76.1 |
| 100% ethanol | n.n. | 386.5 | 68.6 |
| 90% ethanol, 10% water | n.n. | 326.3 | 66.2 |
| $CO_2$/70 bar 15° C. | 3.8 | 635.8 | 95.4 |
| $CO_2$/150 bar 25° C. | 3.8 | 603.5 | 91.2 |
| $CO_2$/220 bar 50° C. | 2.6 | 606.4 | 94.1 |
| $CO_2$/300 bar 50° C. | 1.6 | 653.1 | 97.8 |

In each of these cases tested, an exhaustive extraction of the valuable substances was accompanied by a virtually quantitative extraction of the folpet. The poor folpet recovery rates in the case of the organic solvent extractions indicate a degradation of the fungicide, which can differ in degree depending on the thermal stress during the concentration by evaporation. As it was to be expected, none of the processes was capable of producing extracts specifically only with hop constituents without the fungicide folpet.

The following comparative examples show what the possibility is of removing the folpet in a first step by the selection of the pressure and temperature of the carbon dioxide, without on the other hand extracting valuable hop resins or oils. Carbon dioxide was pumped for three hours at different parameters through hop pellets contaminated with 12.6 ppm of folpet. In the following table, the first column shows the residual folpet contained in the pellets after the first extraction. The second column gives the decontamination rates with respect to the initial content, and the third column indicates the relative yields of hop resins and oils, with respect to the initial content, that stayed with the folpet.

| Extraction parameters | ppm of folpet in hop pellets | % of folpet removed | Extract yield % relative |
|---|---|---|---|
| 100 bar/20° C. | 0.6 | 95 | 34.3 |
| 100 bar/60° C. | 1.9 | 85 | 19.4 |
| 90 bar/60° C. | 4.8 | 62 | 5.1 |
| 70 bar/40° C. | 8.3 | 34 | 2.5 |

In each case, definitely more folpet than hop resins was taken out in the purification stage. Although in the case of an effective removal of the folpet, appreciable amounts of the valuable substances are extracted, which are to be considered as severely contaminated, a virtually quantitative removal of the folpet without dissolving the substances extracted would take uneconomically long and can therefore be considered only where the starting amounts are very low.

It proves to be substantially more advantageous, therefore, to bind the pesticide or pesticides onto an adsorbent without the hop resins and oils. Hop pellets with 12.6 ppm of folpet serve as examples of the process. They are decontaminated in a first step, the folpet is bound to an adsorbent, and the resin and oil content that is necessarily extracted with it is separated by density reduction. It is conceivable to pump $CO_2$ through the hops under normal extraction conditions (i.e., at elevated pressure). This variant proves to be advantageous especially in the case of very low starting data. In any case, however, it is recommendable after removing the pesticide to avoid the adsorption autoclave because to do so can extend the life of the adsorbent. The adsorbent in the present case was added to the batch of hop pellets in a ratio of 1:10. The results, taken together and shown in the following table, show that it is possible by the process described to produce folpet-free extracts. The undesirable pesticide remains in the adsorbent without the formation of degradation products.

| Extraction parameters | | Adsorbent ppm of folpet in Step 1 in total extract | | ppm of folpet in the spent hops | Relative extraction yield % | |
|---|---|---|---|---|---|---|
| Step 1 | Step 2 | | | | Step 1 | Step 2 |
| 220/50 | 220/50 | | | | | |
| 1 h | 2 h | kieselgur | 0.5 | n.n. | 63 | 34 |
| 1 h | 2 h | silica gel | 0.3 | n.n. | 64 | 28 |
| 1 h | 2 h | bentonite | 0.2 | n.n. | 61 | 35 |
| 1 h | 2 h | celite 545 | n.n. | n.n. | 66 | 32 |
| 1 h | 2 h | PVPP | n.n. | n.n. | 62 | 31 |
| 100/60 | 220/50 | | | | | |
| 1.5 h | 2.5 h | kieselgur | 0.3 | n.n. | 10 | 88 |
| 1.5 h | 2.5 h | silica gel | 0.2 | n.n. | 14 | 86 |
| 1.5 h | 2.5 h | bentonite | 0.2 | n.n. | 15 | 82 |
| 1.5 h | 2.5 h | celite 545 | n.n. | n.n. | 12 | 87 |
| 1.5 h | 2.5 h | PVPP | n.n. | n.n. | 13 | 87 |

The inventive method is also illustrated by means of the following Examples, without, however, being limited to these Examples.

1. Detoxification of Black Tea:

In black tea, which is traded as "Russian tea," the following amounts of insecticides were found.

| Endosulfan | 2.5 mg/kg |
|---|---|
| Lindane | 0.05 mg/kg |

(The values, which are below the maximum values permitted in the Federal Republic of Germany, were determined with GC-ECD.)

The above tea (1 kg) was filled into a pressure vessel through which carbon dioxide was then passed for two hours at 150 bar and 60° C. The solvent was purified by passing it under the same conditions of pressure and temperature over an adsorbent consisting of Celite 545 and subsequently returned directly to the tea. Celite is a trademark of the Johns-Manville Corp. for kieselgur of different particle size for use as a filter aid (especially C floc) in gas and column chromotography, as well as a filler for paints and rubber. When the tea was removed from the pressure vessel, the two insecticides were no longer detectable.

2. Detoxification of Tobacco;

Comparison Example 2A

Tobacco leaf, contaminated with the fungicide Metalaxyl, was cut and filled into a pressure vessel. Carbon dioxide was then passed for three hours at 280 bar and 60° C. through the tobacco leaf. During this time, aromatic materials, a portion of the nicotine, as well as the insecticide sprays were dissolved. In the extract, which was isolated by lowering the pressure, Metalaxyl was found quantitatively (GC-ECD).

Example 2B

In a further otherwise identical experiment, a vessel containing Celite 545 as adsorbent was connected in series with the extraction vessel. After adsorption, no Metalaxyl was found in the extract.

3. Detoxification of Paprika:

Comparison Example 3A

To extract the red dye of the paprika fruit (capsanthin), the spicy principal of the paprika, the capsaicin, is dissolved out in a first step at 120 to 180 bar. After the pressure is increased to 300 bar, the carbon dioxide is in a position to dissolve out the dye. By means of this fractionated extraction, the capsaicin and capsanthin can be dissolved and separated from one another. For example, the paprika was analyzed for the fungicide Dichlofluanide(GC-ECD). In the starting material, there were 0.2 mg/kg. This material was found quantitatively in the first fraction (capsaicin).

Example 3B

During the extraction of the capsaicin, an adsorption vessel with Celite 545 was connected in series with the extraction vessel. Only 5% of the Dichlofluanide originally present was found in the extract (limit of detection).

4. Detoxification of Rape:

Rapeseed was analyzed for the insecticide Endosulfan and the fungicide Vinclozolin, and values of 0.3 and 0.8 mg/kg, respectively, were obtained.

Comparison Example 4A

The above-mentioned seed was extracted at 300 bar and 60° C. with carbon dioxide. The oils were recovered (35% after five hours) by lowering the pressure (lowering the density). Both plant-protective agents were found quantitatively in the oil.

Example 4B

An absorption vessel with Celite 545 was connected in series with the extraction vessel. Under conditions otherwise identical with those in the Comparison Example 4A, the Endosulfan and the Vinclozolin were found to be present in the extract at the end of the extraction at concentrations barely above the limit of detection of, in each case, 0.1 mg/kg.

Example 4C

Since the amount of plant-protective agent remaining in the extract appeared to be too high, a preliminary extraction at a lower pressure was carried out, the absorption vessel being connected in series. Carbon dioxide was passed through the extraction and adsorption vessels for one hour at 150 bar and 60° C. In this case, 4.5% of the total amount of oil was separated in the separator. After that, the extraction was continued as in the comparison example until the remaining amount of oil had been extracted. Both plant-protective agents were found in the oil of the preextraction; in the bulk of the oil, the concentration of these agents was too low to be detected.

What we claim is:

1. A process for extracting nonpolar constituents from a natural substance while simultaneously separating soluble residues of nonpolar plant protectives from the natural substance comprising, in a first step, extracting the soluble plant-protective residue and nonpolar constituents from said natural substance with a solvent comprising compressed carbon dioxide under selected temperature and pressure conditions sufficient to extract the soluble plant-protective residue and nonpolar constituents from said natural substance to form a dissolved mixture, and then, in a second step, passing the dissolved mixture through an adsorbent to selectively adsorb the plant-protective residue from the mixture.

2. A process as in claim 1, wherein the plant-protective residue is extracted at low density of the solvent at pressures between 70 and 120 bar and temperatures between 40° C. and 80° C.

3. A process as in claim 1, wherein the plant-protective residue is selectively adsorbed in the second step by a solid adsorbent under the same pressure conditions as the extraction.

4. A process as in claim 3, wherein the adsorbent is selected from the group consisting of kieselgur, silica gel, bentonite, polyvinylpolypyrrolidone and mixtures thereof.

5. A process as in claim 3, further comprising recycling the solvent to the extracting step under the same pressure conditions as the extraction and adsorption.

6. A process as in claim 1, wherein the plant-protective residue is adsorbed at a temperature resulting in an adsorption/ desorption equilibrium lying on the adsorption side, thereby preventing any possible desorption.

7. A process as in claim 1, further comprising repeating the extraction step at least once.

8. A process as in claim 7, wherein a different adsorbent is used in each extracting step.

9. A process as in claim 1, further comprising separating the nonpolar constituents from the dissolved mixture by reducing the density of the mixture after the adsorption step.

10. A process as in claim 9, wherein the nonpolar constituents are separated at a pressure between 40 and 60 bar and a temperature above a carbon dioxide pressure curve, at which the solvent is in gaseous form.

11. A process as in claim 9, further comprising returning the solvent to the extracting step after adsorption and separation of the plant-protective residue and nonpolar constituents therefrom.

12. A process as in claim 9, wherein the density is reduced by reducing pressure of the mixture and evaporating carbon dioxide.

13. A process as in claim 1, wherein said natural substance is selected from the group consisting of oil-bearing seeds, seeds and nuts.

14. A process as in claim 1, wherein said natural substance is selected from the group consisting of fruits, vegetables, herbs and tobacco.

15. A process as in claim 1, wherein said natural substance is selected from the group consisting of medicinal roots and herbs.

16. A process as in claim 1, wherein said natural substance is a spice plant.

* * * * *